(12) United States Patent
Nelson (10) Patent No.: US 9,800,672 B2
(45) Date of Patent: Oct. 24, 2017

(54) COMPUTER WORK DISTRIBUTION SYSTEM AND METHOD

(71) Applicant: Eugene Edwin Nelson, Maple Grove, MN (US)

(72) Inventor: Eugene Edwin Nelson, Maple Grove, MN (US)

( * ) Notice: Subject to any disclaimer, the term of this patent is extended or adjusted under 35 U.S.C. 154(b) by 386 days.

(21) Appl. No.: 14/682,533

(22) Filed: Apr. 9, 2015

(65) Prior Publication Data

US 2016/0301757 A1   Oct. 13, 2016

(51) Int. Cl.
*H04L 29/06* (2006.01)
*H04L 29/08* (2006.01)

(52) U.S. Cl.
CPC ............ *H04L 67/142* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 4,665,520 A | 5/1987 | Strom et al. | |
| 6,216,151 B1* | 4/2001 | Antoun | H04L 63/061 709/203 |
| 6,230,160 B1 | 5/2001 | Chan et al. | |
| 6,519,712 B1 | 2/2003 | Kim et al. | |
| 6,523,172 B1 | 2/2003 | Martinez-guerra et al. | |
| 6,898,604 B1 | 5/2005 | Ballinger et al. | |
| 6,910,154 B1 | 6/2005 | Schoenthal | |
| 7,337,192 B2 | 2/2008 | Stark et al. | |
| 7,827,205 B2 | 11/2010 | Okunseinde et al. | |
| 7,925,675 B2 | 4/2011 | Stark et al. | |
| 7,949,947 B2 | 5/2011 | Frei et al. | |
| 8,238,350 B2 | 8/2012 | Godman et al. | |
| 8,407,664 B2 | 3/2013 | Moosmann | |
| 8,458,517 B1 | 6/2013 | Vermeulen et al. | |
| 8,489,921 B2 | 7/2013 | Varadarajan et al. | |
| 8,527,809 B1 | 9/2013 | Backensto et al. | |
| 2014/0258425 A1* | 9/2014 | Dietz | H04L 51/04 709/206 |

FOREIGN PATENT DOCUMENTS

WO   2004077216   1/2004

OTHER PUBLICATIONS

Haas, Miller, Niswonger, Tork Roth, Schwarz and Wimmers, Bulletin of the Technical Committee on Data Engineering, "Transforming Heterogeneous Data with Database Middleware, Beyond Integration", Mar. 1999.

Laaden, Oren; Phung, Dan; Nieh, Jason; Proceedings of the 2005 IEEE International Conference on Cluster Computing (Cluster 2005), Boston, MA, "Transparent Checkpoint-Restart of Distributed Applications on Commodity Clusters," Sep. 2005.

Vieira, Gustavo M.D.; Buzato, Luiz E.; Proceedings of the 24th Brazilian Symposium on Computer Networks, SBRC 6, "Distributed Checkpointing: Analysis and Benchmarks." 2006.

* cited by examiner

*Primary Examiner* — Azizul Choudhury (74) *Attorney, Agent, or Firm* — Tysver Beck Evans, PLLC (57) ABSTRACT

A system and method are presented that improve work cooperation among computers. Communication between programs is combined with restart data to travel via a manager on a third computer. Work is represented by a hierarchical set of client to server session pairs that contain restart and message data. Reliability, security, scalability, and aggregate performance are improved with minimal impact on latency of a single piece of work.

10 Claims, 7 Drawing Sheets

COMPUTER WORK DISTRIBUTION SYSTEM AND METHOD

FIELD OF THE INVENTION

The present application relates to the field of work management in the field of computer programming for the purpose of inter-computer cooperation. More particularly, the described embodiments relate to a system and method for distributing work across cooperating computers as a hierarchy of client-to-server session pairs containing restart data and work distribution messages.

SUMMARY

One embodiment of the present invention organizes work that is assigned to a server session. A server session instantiates one or more client sessions that perform a portion of the overall work assigned to that server session. The client is able to send work to a separate server operating on a different computer. In this way, each client is associated with a client-to-server session pair. Client and server session data is exchanged via a manager program on a third computer. Requests from a client are forwarded by the manager program to a server session assigned to that client in the client-to-server session pair. Response data is sent from the server back to the client through the manager program. In the preferred embodiment, request and response messages are stored in separate message queues that are maintained at the client session, at the server session, and at the manager program.

Each client session retains its request message queue and restart data. Each server session also maintains restart data for itself as well as a queue of response messages that it generates for a client session with which the server session is communicating. Restart data contains sufficient information to allow a program instance on a different computer to recover an interrupted client or server session and continue its message communications without interruption.

Each server session shares its data, including the data from its child client sessions, with the manager program. In the preferred embodiment, client restart data and request messages in the client request message queue are shared with the manager program only as part of the parent server session's communication with the manager program. The manager program uses this data to forward response and request messages, while maintaining the restart data for the server session and the server session's clients. The manager can restart a session on another computer by supplying the restart data and message queues appropriate for that session. In one embodiment, the manager program is also backed up by duplicating its data to a backup manager program on a different computer.

DETAILED DESCRIPTION

Checkpoints and Distributed Computing

Although modern computers are quite stable, unexpected failure or planned outages do occur that cause computer programs running on the computer to stop and start over from the beginning. An operating system feature called a checkpoint allows a program to periodically record its state so that this memory state can be recalled if a computer outage occurs. Because the checkpoint image of the program memory space is frequently stored in a shared storage location, it is possible to restart the program on a different computer and then provide the checkpoint data to reset the internal program memory to the state that existed when the checkpoint was saved. The program can then restart as if an outage did not occur. Of course, work performed after the checkpoint data was saved and before interruption will be lost.

One problem with the existing process of saving checkpoint is that the amount of data being saved is very large. Each checkpoint will dump the entire memory space data to storage. As a result, it is not feasible to perform checkpoints continuously, and data and work performed after the last checkpoint will be subject to loss.

Another limitation of checkpoints is that they do not contain any mechanism to track and restore communication states with another computer. At any given time, an algorithm may be communicating messages and data with a remote processor. The overhead for ensuring message delivery is typically performed by the transport layer in a networking communication protocol. For instance, during a TCP/IP communication that is typically used for Internet communications, the transmission control protocol (or TCP) is responsible for reliably delivering messaging packets between computers during a network connection. However, if a computer or a process operating on a computer needs to be restarted, the network connection with a remote computer will be lost. As a result, the TCP layer will no longer attempt to deliver messages, and any process restarted through the checkpoint system will have no knowledge of the current status of communications/messages being exchanged with a remote computer. As a result, the messaging process will be forced to start over, or the algorithms itself will need to be specially programmed to handle these situations and laboriously reconstruct the messaging status with the remote computer.

Managing communications and messages is especially important when a single bundle of work is being divided across many computers. This kind of work distribution can take a variety of forms:

Distributed Computing: Distributed computing is an infrastructure for large compute algorithms that are sliced into pieces, distributed, executed and results combined.

General-Purpose Messaging: A general-purpose message infrastructure, such as CORBA or DCOM, coordinates work between various objects providing services.

RPC: A compiler feature called RPC passes data and causes execution of a procedure within a program on another computer.

Store and Forward Messaging: A store and forward message queue delivers asynchronous messages independent of when sender and receiver are active.

Because of the inability of a standard checkpoint system to reflect the state of inter-computer communications in these types of environment, there is no generally recognized scheme to handle computer failures and outages in the context of inter-computer messaging. Instead, reliability and security issues within these approaches are largely left to the application programming.

System 100

Figure 1:
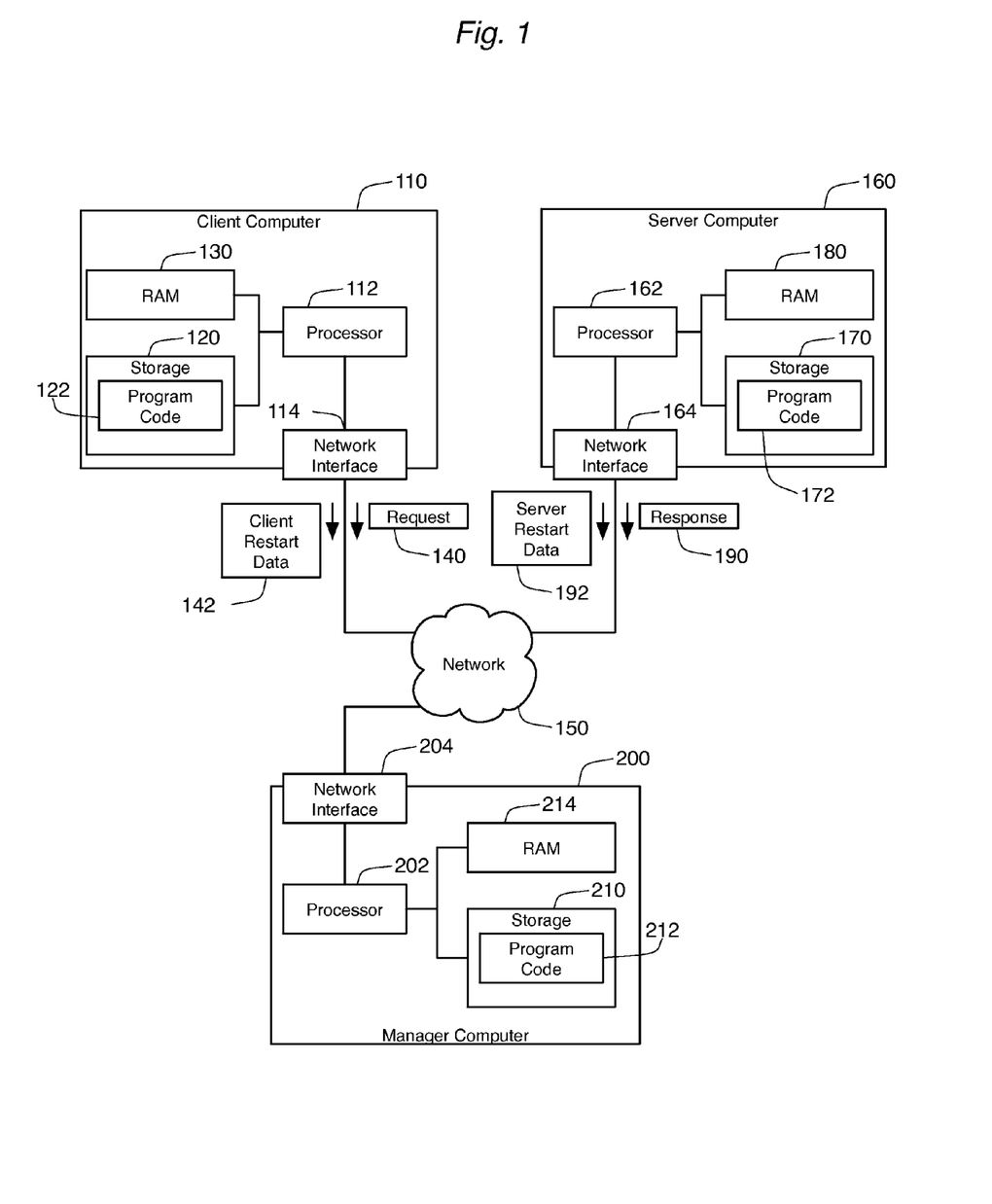
FIG. 1 is a schematic view of a system utilizing the present invention.

FIG. 1 shows a system 100 that utilizes the disclosed embodiments to reliably coordinate work from one computer 110 to another computer 160 and to handle interruptions without losing the current messaging state of the work. In FIG. 1, this is handled by passing communications through a third computer 200. The transfer of data typically takes place over a network 150 such as the Internet or a TCP/IP local area network 150 (or any other type of inter-computer network using serial based network protocols). Alternatively, the transfer of data can take place over a serial bus 150. For the purposes of this disclosure, it will be assumed that the communication between a client computer 110, a manager computer 200, and a server computer 160 takes place over a serial-based network 150.

The client computer 110 is a typical computing system known in the prior art. As such, the computer 110 utilizes a processor 112 that operates according to computer programming instructions. These instructions may be stored in a non-transitory data store 120, such as flash memory or a hard disk drive. In FIG. 1, this data storage 120 is shown located within the physical structure of computer 110. In alternative embodiments, this storage 120 may be locally attached external storage, or even remote storage that is received over a computer network such as network 150. Programming instructions for the processor 112 can be stored in the storage 120 as compiled object code 122. When the computer 110 wishes to perform the instructions contained in the compiled programming code 122, such code is typically loaded into and executed in random access memory or RAM 130. Transitory RAM 130 operates much faster than non-transitory storage 120, and so moving the compiled programming code 122 to RAM 130 for operation speeds up the operation of the computer 110. In some embodiments, the programming code 122 executed by the processor 112 is not compiled into object code but is implemented using some other method (such as through the use of an interpreter). In this context, the code 122 is still transferred to the computer's RAM 130 for faster execution by the interpreter.

The client computer 110 operates a client session that communicates work requests 140 to a server session on a server computer 160. The server computer responds to the work requests 140 with a response message 190 that communicates the results of the requested work. The client session is assigned to the server session via a manager computer 200. Even after the manager computer 200 has associated the client session with the server session through a client-to-server session pair, all requests 140 and responses 190 for that client-to-server session pair will pass through the manager computer 200.

The server computer 160 and the manager computer 200 are constructed similarly to the client computer 110, as both computers 160, 200 have a processor 162, 202, a network interface 164, 204, storage 170, 210 that contains program code 172, 212, and RAM 180, 220. These various components function in the same manner described above in connection with client computer 110.

In the preferred embodiment, the client computer 110 also sends restart data 142 to the manager computer 200 every time it sends a request message 140. The client restart data 142 contains that information that will be necessary to restart the client computer 110 if the client computer ever gets interrupted or otherwise fails. Similarly, the server computer 160 sends server restart data 192 (containing information necessary to restart the server computer 160) to the manager computer 200 every time the server computer 160 sends response data 190.

The manager computer 200 stores the request messages 140, the latest client restart data 142, the response messages 190, and the latest server restart data 192. In one embodiment, all of this data is stored in the RAM 214 of the manager computer 200. In this way, the manager computer 200 will have all the information necessary to restart the processes on the client computer 110 or server computer 160, and also all the information necessary to track the current status of message communications between the computers 110, 160.

Figure 2:
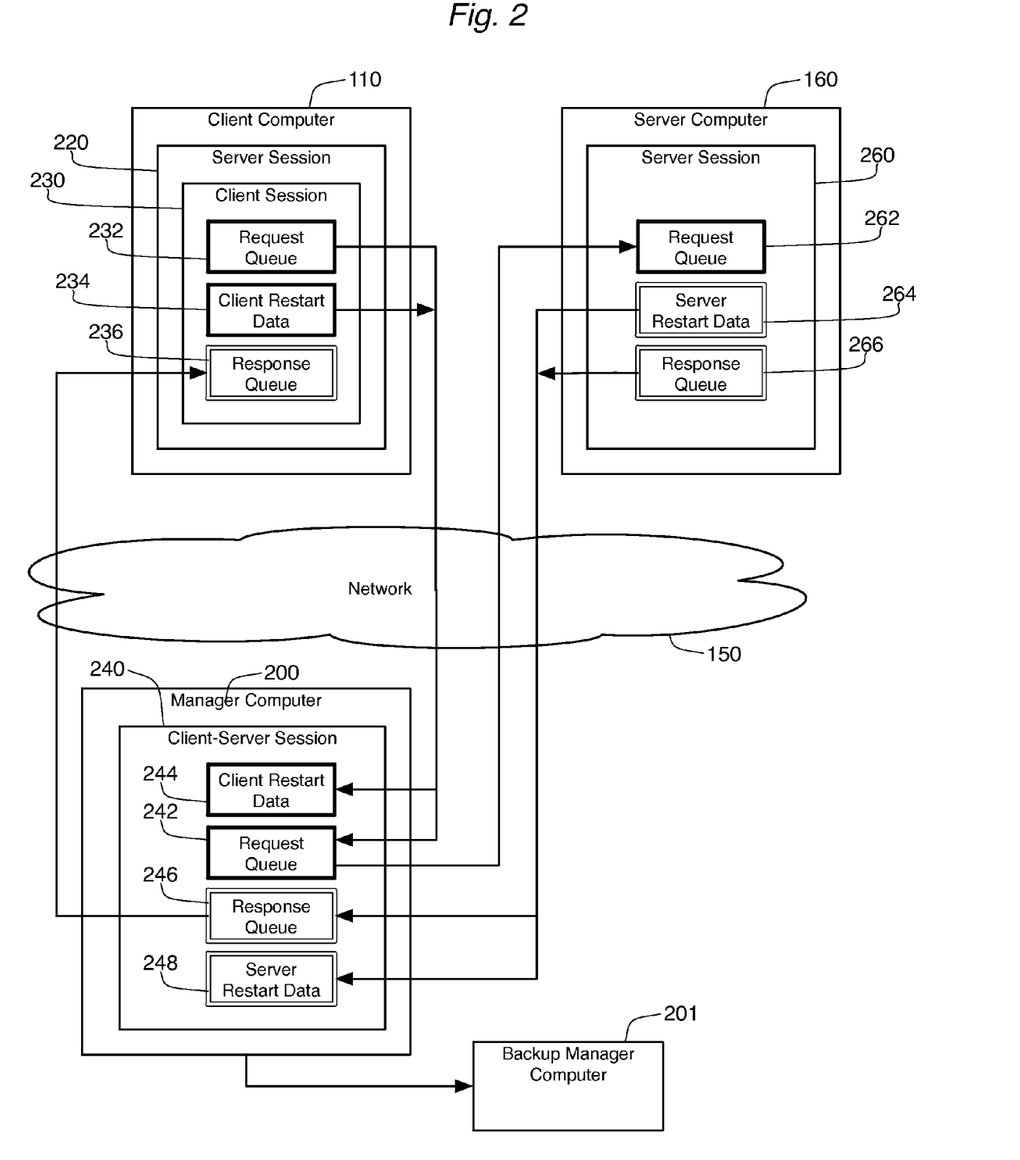
FIG. 2 is an alternative schematic diagram of the system of FIG. 1 emphasizing the data shared between and client and server session through the manager computer.

FIG. 2 schematically shows the client and server sessions involved in this client-server communication. The first thing to note is that the client session 230 on the client computer 110 actually operates within the framework of a server session 220. In the preferred embodiment, all clients operate as an element or component within a server session. This is true even if the client session 210 on the client computer 110 is operating on work that originated within the client computer 110, such as a request from an application running on the client computer 110. The sever session 220 and the client session 230 are created and operated according to program code 122.

The data within the client session 230 shown in FIG. 2 is organized as an array of request messages 232 (also known as the request queue 232), client restart data 234, and an array of response messages 236 (also known as the response queue 236). Note that the client session 230 communicates with a server session 260 operating on the server computer 160. The server session 260 maintains its own copy of the request message data 262 and the response message data 266. The server session 260 also identifies and maintains server restart data 264.

The described embodiment sends and receives a message over a simulated connection between the client session 230 and the server session 260. This simulated connection is realized by the sending of messages through the request message queues 232, 262 and the response message queues 236, 266. As explained below, it is possible for one server session 220 to manage multiple client sessions 230 each communicating to separate server sessions 260. Although each of these client-server communications will be treated as separate simulated connections, all data related to these connections will flow through a single physical connection to the manager computer 200.

The client session 230 transmits request messages 140 to the manager computer 200 via network 150 within the context of a request queue 232. The request queue 232 contains all of the active request messages 140 that have been sent from the client session 230 to the server session 260. In one embodiment, the client always transmits the request queue 232 and the client restart data 234 together when sending a communication to the manager computer 200. The manager computer 200 decodes this data and places copies of the request queue 242 and the client restart data 244 in a client-server session 240 that is maintained and tracked by the manager computer 200. In the preferred embodiment, this data 242, 244 is stored in the RAM 214 of the manager computer 200. A different client-server session 240 is created and maintained by the manager computer 200 for each client to server session pair communication being tracked by the computer 200. In this way, the manager computer 200 can provide client-server sessions 240 between multiple client computers 110 and server computers 160. Furthermore, although it is not shown in FIG. 2, a single server session 220 operating on the client computer 110 may have multiple client sessions 230. In addition, a single computer 160 may operate many server sessions 260 simultaneously. Consequently, one server session 220 can distribute work to a multitude of server sessions 260 (operating on one or multiple server computers 160) by utilizing multiple client sessions 230 operating through multiple client-server session pairs 240 on the manager computer 200.

The client-server session 240 on the manager computer 200 will communicate the request messages 140 in the form of the request queue 242 to the server session 260 operating on the server computer 160. The server computer 160 receives this data as a serial stream over the network 150, and the serial session 260 operating on the computer 160 then reconstructs the request messages into its copy of the request message queue 262. The server session 260 performs work as directed by the request message 140 found in the request message queue 262. The server session provides the results of this work back to the client session 230 in the form of a response message 190. The response message 190 is sent inside of a response message queue 266 that contains all of the current response messages 190 from the server session 260 to the client session 230.

The server session 260 sends the response queue 266 along with the server restart data 264 to the manager computer 200 via the serial-based network 150. The client-server session 240 saves its own copy of the response queue 246 and the server restart data 248 in RAM 214. The client-server session 240 will then forward the response message queue 246 to the client session 230 on the client computer 110 via network 150. The client session 230 will save this data as its own copy of the response queue 236. The client session 230 will analyze the response queue 236 to discover response messages 190 in the response queue 236 that provide the results of the work done on behalf of a request message 140 in the request queue 232. If such a response message 190 is found, the corresponding request message 140 will be removed from the request queue 232 as that request has been fulfilled.

In this manner, the client session 230 is responsible for removing request messages 140 from the request queue 232. Such messages 140 will be removed only after the client session 230 has received an appropriate response message 190 for that request 140. The next time the request queue 232 is sent by the client session 230 to the server session 260 (via client-server session 240), the server session 260 will analyze the request queue 262 and recognize that a request message 140 has been removed from the request queue 262. The server session 260 will then remove the corresponding response message 190 from the response queue 266. In this way, only the server session 260 removes response messages 190 from the response queue 266, and such messages 190 will be removed only after the server session 260 has verified that the request 140 that triggered the response message 190 has be removed from the request queue 262.

In the preferred embodiment, only a single response message 190 is sent that contains the result of the work performed for a single request message 140. This one-to-one correspondence between request messages 140 and response messages 190 simplifies the handling of request and response messages 140, 190.

It is possible that the client session 230 and the server session 260 will communicate other messages to each other, such as acknowledgement messages that indicate when communications have been received, partial result messages that provide a partial result for work being performed by the server session 260, or status update messages that communicate the status of the work being performed by the server session 260. In the preferred embodiment, these messages are communicated between the client session 230 and the server session 260, but they are not considered request messages 140 or response messages 190, and therefore are not communicated as part of the request queue 232 or the response queue 266. The communications of these messages may or may not pass through the client-server session 240 maintained by the manager computer 200. In the preferred embodiment, all client-server communications pass through the manager computer 200 because the client session 230 is ignorant of the identity and network address of the server session, and vice versa. As a result, even simple acknowledgement communications between the client session 230 and the server session 260 pass through the manager computer 200. An alternative embodiment will communicate these other kinds of message via a client-server session 240 and by adding an event queue and ack queue similar to the request queue 242 and response queue 246. A server session 260 places a partial work result or status update into an event queue. A client session 230 examines the event queue to find a partial work result or status update and replies with an acknowledgement placed in the ack queue. The server session 260 removes an event from the event queue that corresponds to an acknowledgement found in the ack queue. The client session 230 removes an acknowledgement from the ack queue when there is no corresponding event in the event queue.

In other embodiments, the request message 140 and the response messages 190 must pass through the manager computer 200, and the manager computer 200 remains responsible for establishing and re-establishing communications between the client session 230 and the server session 260, but the system is flexible enough to allow some direct communications between these sessions 230, 260. For instance, the client session 230 and the server session 260 may negotiate a bulk data transfer that passes over the network 150 but does not pass through the manager computer 200. Even in this circumstance, the manager computer 200 will still track the current state of these communications and the response message 190 sent over the manager computer 200 will still identify (if not contain) all of the data that was sent.

In the preferred embodiment, the manager computer 200 will periodically submit its data 242-248 to a backup manager computer 201. The backup manager computer 201 will be programmed to step in and replace the manager computer 200 in case the manager computer 200 fails. In this way, the data in maintained by the client-server session 240 can survive the interruption of processing by the manager computer 200. Note that if the manager computer 200 does shut down, the communications link between the manager computer 200 and both the client computer 110 and the server computer 160 will likely be terminated. Thus, in the preferred embodiment, a restart of the manager computer 200

(or the takeover of the operation of the client-server session 240 by the backup manager computer 201) will cause all server sessions 220, 260 to be restarted. If the manager computer 200 is not available, the backup manager computer 201 will establish connections with the client computer 110 and the server computer 160, will cause the server sessions 220, 260 (and all child client sessions 230) to restart, will provide appropriate restart data and the response and request queues to assist the restarted server sessions 220, 260 so that the current state of the communications will not be lost, and finally will reestablish the client-server session 240 on itself. By so doing, the backup manager computer 201 will ensure that the state of communications between the client session 230 and the server session 260 will not be lost because of interruption of the manager computer 200, and will ensure that all future communications will pass through and be tracked by the client-server session 240 now operating on that backup manager computer 201.

Restart Data

Figure 3:
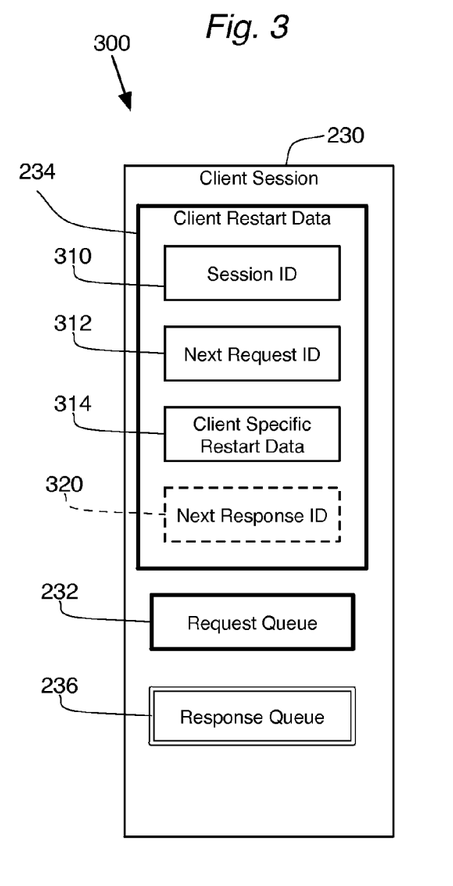
FIG. 3 is a schematic diagram showing the data maintained by a client session.

FIG. 3 shows the data that is maintained by a client session 230. As explained above, the client session maintains a client request queue 232 containing the request messages 140 sent to a server session 260, a response queue 236 of response messages 190 sent by the server session 260, and client restart data 234. Client restart data 234 is the data necessary for the client session 230 to restart should its process be interrupted. In particular, the client restart data 234 includes a session id 310, which is used to uniquely identify a client-server session 240, a next request id 312, which uniquely identifies a request message 140 within the request queue 232, and client-specific restart data 314.

In the preferred embodiment, a request identifier is an integer that identifies a particular request 140 in the request queue 232. The next request ID 312 is the request identifier that is assigned to the next request message. Request identifies may take the form of an infrequently wrapping monotonically increasing integer such that each new request message 140 will be assigned the next available request ID 312.

The client specific restart data 314 contains whatever data the programming code 122 needs in order to resume a client session 230 after failure of the current client session 230. The programming code 122 that implements the client session 230 will define the client-specific restart data 314, which means that the content of this data 314 will vary from client session 230 to client session 230. This is the same code 122 that defines the actual work of the client session. This code is not further explained herein, as the actual work performed by the client session 230 or the server session 260 is outside the scope of this disclosure.

As explained above, one embodiment of the present invention allows only a single response message 190 to be sent for each request message 140. The response message 190 contains the result of the work performed by the server session 260 for a particular request message 140. As a result, it is possible to use the request message ID within a request message 140 as the response message identifier for the corresponding response message 190. In this manner, the client session 230 need only examine the identifier within a response message 190 to immediately know the request message identifier and the corresponding request message 140 that is identified by that identifier. In FIG. 3, the client session 230 is shown tracking the next response identifier 320 that identifies the next response message 190 in the response queue 236. While this data 320 can be included with the client restart data 234 sent to the manager computer 200, it is possible to recreate this next response ID 320 simply by analyzing the current content of the request and response queues 232, 236. As a result, the next response identifier 320 is shown within a dotted line in FIG. 3, which indicates that it is not necessary to include this within the client restart data 234. Nonetheless, tracking this data 320 does speed processing of the response queue 236.

Figure 4:
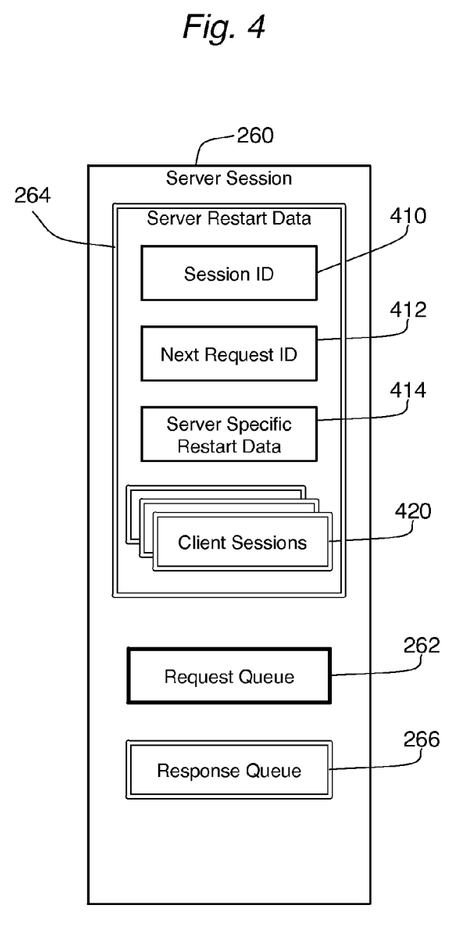
FIG. 4 is a schematic diagram showing the data maintained by a server session.

FIG. 4 shows the data that is maintained by each server session 260. This data include the server's copy of the request queue 262, the server's response queue 266, and the server restart data 264. The server restart data 264 includes the session identifier 410 for the client-server session 240 on the manager computer 200, the next request ID 412 so that the server session 260 can identify the next request message 140 that it needs to handle in the request queue 262, and the server specific restart data 414. As with the client specific restart data 314, the server specific restart data 414 contains whatever data the programming code 172 needs in order to resume a server session 260 after failure of the current session 260. The programming code 172 will define the server-specific restart data 414, which means that the content of this data 414 will vary from session 260 to session 260. As explained above, the preferred embodiment uses the request ID for a request message 140 as the response ID for the corresponding response message 190. As a result, it is not necessary to maintain a next response ID value in the server session restart data 264.

As shown in FIG. 4, it is to be expected that the server 260 that is performing work for client session 230 will have its own client sessions 420. These client sessions 420 may be created by the server session 260 to handle a portion of the work request(s) made by the client session 230. In other words, the server session 260 may receive a request message 140 and decide to divide the work identified in that request message 140 into multiple client sessions 420. Each client session 420 will be responsible for performing a portion of this work. In performing its portion of the work, a particular client session 420 may request that the manager computer 200 create a new client-server session allowing that client session 420 to request that some of its work be accomplished by a remote server session. The manager computer 200 will respond to this request from the client session 420 by creating a new client-server session and linking that client session 420 with a remote server session. Each client session 420 will manage its own data, which will include the same type of data identified in FIG. 3 for client session 230. Note that information about the state of server session 260 is complete only if the data for each of the client sessions 420 is included in this data. Because the restart data and response queues inside each of the server's client session 420 are necessary in order for the server session 260 to be able to resume after interruption, the server session 260 must send this data to the manager computer 200 for safe-keeping.

Server-Centered Communications

Figure 5:
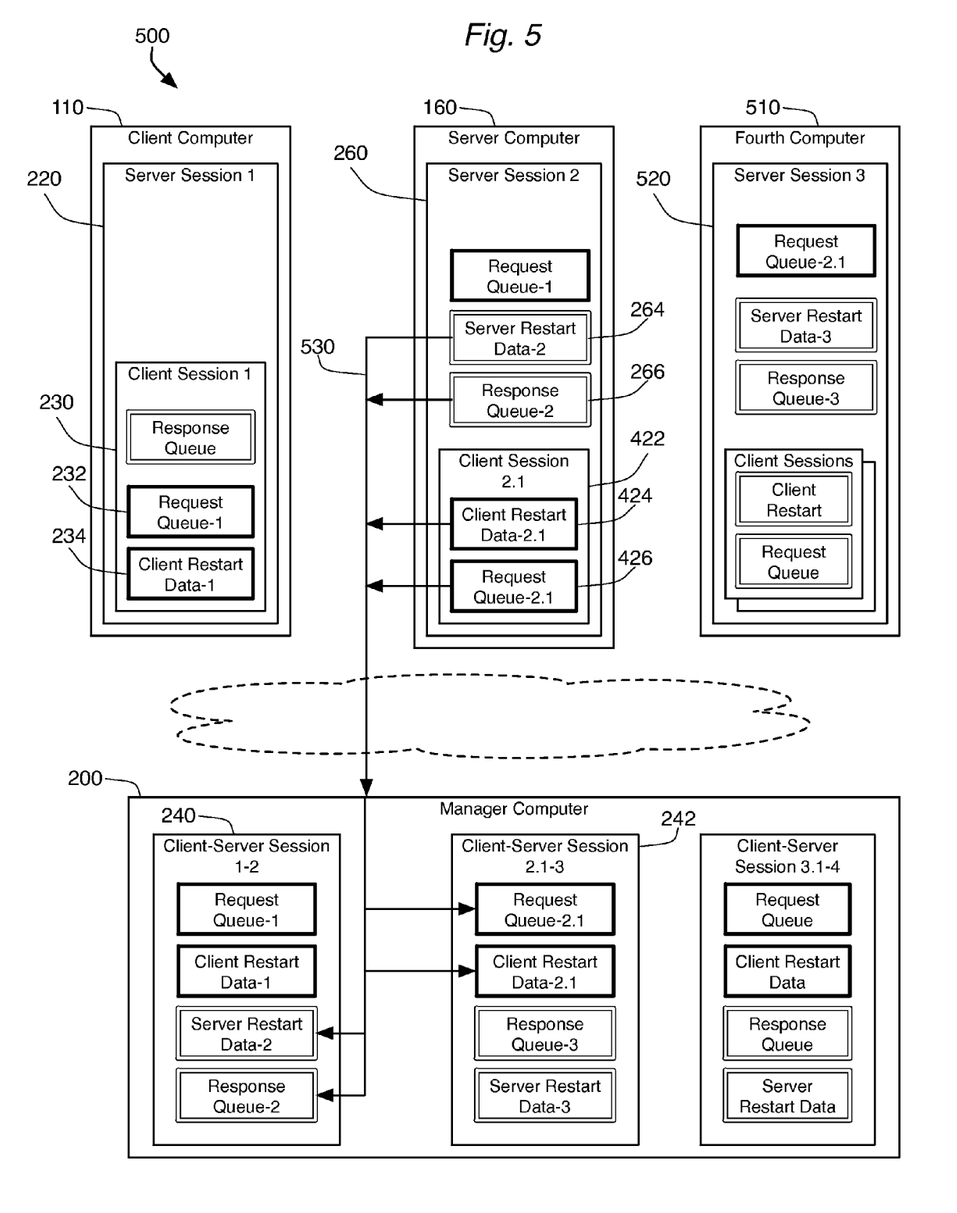
FIG. 5 is a schematic diagram showing an embodiment where client data is shared with the manager computer only when the parent server session data is shared.

One process for handling this communication of data for client sessions 420 within a server session 260 is shown in FIG. 5. FIG. 5 shows a system 500 of computers that include the same client computer 110, server computer 160, and manager computer 200 that were shown in FIGS. 1 and 2. FIG. 5 adds a fourth computer 510 to this system 500. In FIG. 5, the server session 220 operating on the client computer 110 is labeled server session 1, and the client session 230 on client computer 110 is likewise named client session 1. The server session 260 on the server computer 160 has been labeled server session 2. One of the client sessions 420 operating within server session 2 (260) has been identified as client session 2.1 (422). In the embodiment shown in FIG. 5, client session 2.1 (422) communicates with server session 3 (520) operating on the fourth computer 510. The communication between client session 1 (230) and server session 2 (260) pass through the manager computer 200. In particular, the manager computer 200 creates a client-server session 240 to track the data related to this communication. In FIG. 5, this client-server session 240 is labeled "Client-Server Session 1-2" to indicate that it tracks communications made between client session 1 (230) and server session 2 (260). Communications between client session 2.1 (422) and server session 3 (520) are tracked in a separate client-server session on the manager computer, namely client-server session 2.1-3 (242). As can be seen in FIG. 5, client-server session 2.1-3 (242) contains client restart data and a request queue from client session 2.1 (422). In addition, client-server session 2.1-3 (242) contains response queue data and server restart data that was received from the server session (520) operating on the fourth computer 510.

In the preferred embodiment, all data sent to the manager computer 200 from client sessions 230, 421, is transmitted only when data is being transmitted by the parent server sessions 220, 260, respectively. Thus, client session 2.1 (422) would not independently send its client restart data and request queue to the manager computer 200 for inclusion in the client-server session 2.1-3 (242). Rather, server session 2 (260) is responsible for determining when all of its data 264, 266, along with the data for client session 422 (namely data elements 424, 426), will be sent to the manager computer 200. In the preferred embodiment, the server session 2 (260) sends this data periodically (such as at a regular time interval—0.2 seconds or 0.5 seconds), or sends this data whenever the server session 2 (260) has no work to perform or otherwise is idle.

This periodic communication from the server session 2 (260) is shown in FIG. 5 as communication 530. This communication includes the server restart data-2 (264) and the response queue 2 (266) data that is associated with client-server session 1-2 (240), as well as client restart data-2.1 (424) and client request queue-2.1 (426), which is associated with client-server session 2.1-3 (242). When the manager computer 200 receives this communication 530, it divides and stores this data in the appropriate client-server session 242, 242, as shown in FIG. 2. Thus while the server session 2 (260) is communicated with the client session 1 (230) through a simulated connection to that session 230, and while client session 2.1 is communicating with server session 3 (520) through a separate simulated connection, all of these communications are actually sent through a single network communication link with the manager computer 200.

Methods

Figure 6:
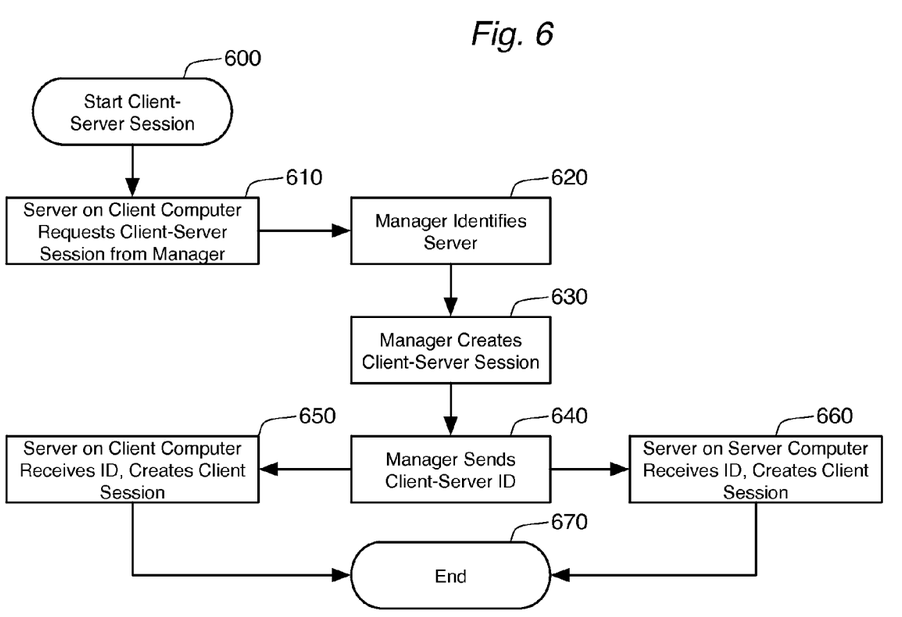
FIG. 6 is a flow chart showing a process of starting a client-server session.

FIG. 6 shows a method for establishing a client-server session. The method starts at step 610 with a server session 220 operating on a client computer 110 making a request to the manager computer 200 to create a client-server session for a particular type of service. At step 620, the manager computer identifies a server computer 160 that can perform this service. The manager computer 200 then initiates a client-server session 240 to provide this service at step 630 and creates a unique identifier for this client-server session. At step 640, the manager sends the client-server ID back to the requesting server session 220 on the client computer 110. At step 650, the server session 220 on the client computer 110 creates a client session 230 and associates that session 230 with that client-server session ID. At step 640, the manager computer 200 also sends the client-server ID to the identified server computer 160. The server computer 160 receives the client-server ID and initiates a server session 260 to handle this interaction based on that client-server ID (step 660). The method then ends at step 670.

Figure 7:
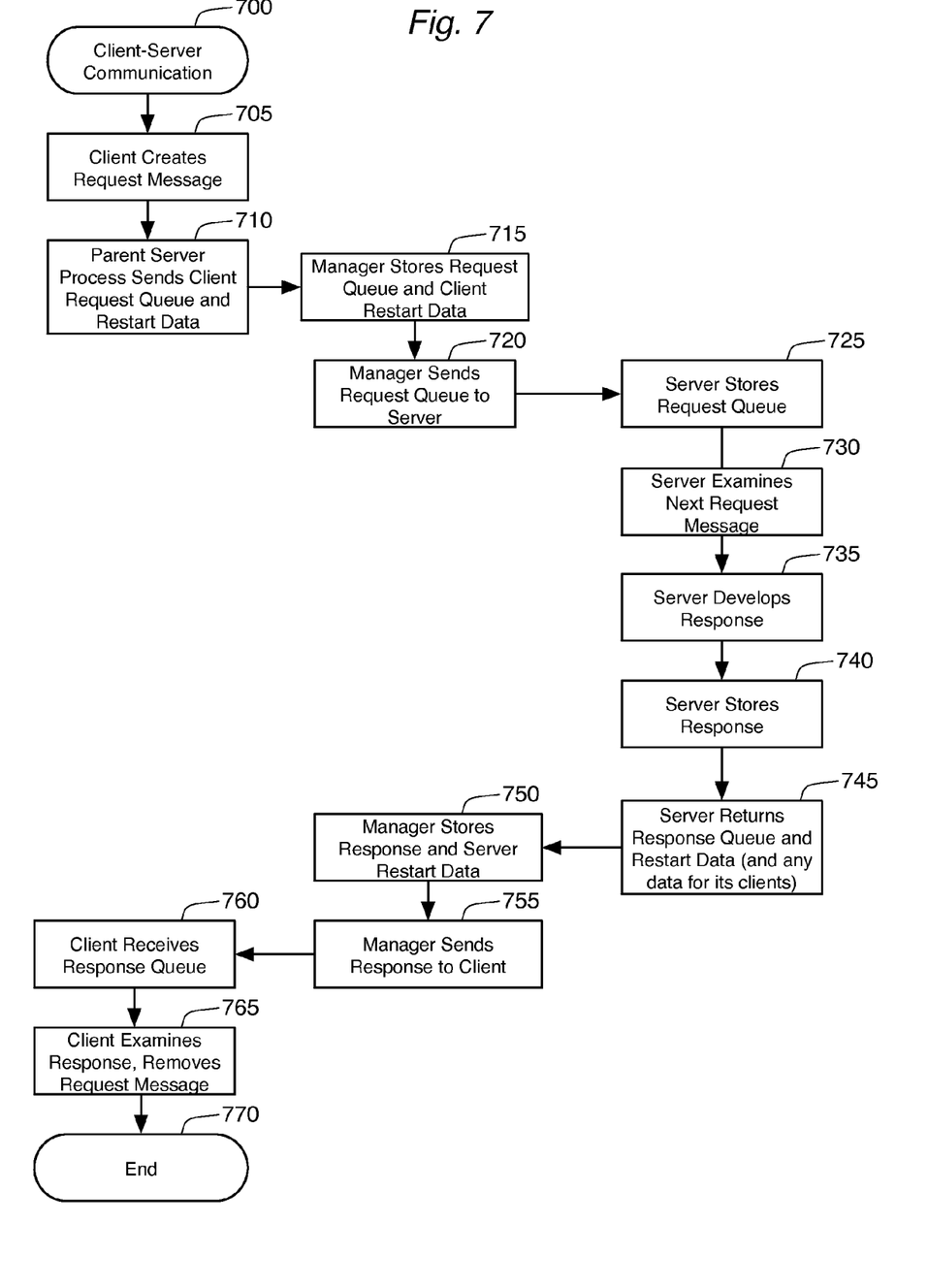
FIG. 7 is a flow chart showing a process for client-server communications.

Once the client-server session is created, the client session 230 can communicate with the remote server session 260 through process 700 shown in FIG. 7. This process begins at step 705 with the client session 230 creating a request message 140 that requests some work to be performed. This request message 140 is stored in the client's request queue 232. At step 710, the parent server session 220 determines that it is time to send its data to the manager computer 200. In so doing, the server session 220 sends data from its client sessions, including client session 230. This data includes the client's request queue 232 and the client restart data 234.

At step 715, the manager computer 200 receives this data and stores the request queue and the client restart data in its memory (as copies 242, 244, respectively). The manager computer 200 is then responsible for submitting the request queue to the server session 260 associated with this client session 230 in client-server session 240. This occurs at step 720.

At step 725, the server session 260 stores the request queue as its copy 262. The server session 260 identifies the next request message 140 in the queue 262 (step 730) and performs the necessary processing to develop a response to this request (step 735). As explained above, this processing may include the creation of new client sessions (such as session 422) that request work to be performed by other remote server sessions (such as session 520). The server session 260 then stores this response 190 in is response queue 266 at step 740. As explained above, one embodiment places a request identifier in each request message, and then places the same request identifier into the corresponding response message. In this way, the correlation between each request message 140 and response 190 will be easy to identify. At the appropriate time, the server session 260 will provide the manager computer 200 all of its data (including the response queue 266, the server restart data 264, and data for any child client sessions such as session 422). This occurs at step 745. The manager computer 200 receives this communication at step 750, and stores the data with the appropriate client-server sessions. Thus, the server restart data 264 and the response queue 266 will be stored in association with client-server session 240.

The manager computer 200 then forwards the response queue to client session 230 at step 755. When the client session 230 receives the response queue (step 760), it will examining the response queue and identify the response message 190 for its request message 140 (step 765). At this point, the client session 230 will remove the answered request message 140 from its request queue 232. When the request queue is next sent to the server session 260, the server session 260 will be able to identify that this request message 140 is no longer found in the queue. Once this identification is made, the server session 260 will remove its corresponding response message 190 from the response queue 266. This ensures that the response message 190 is not removed until the client session 230 has assuredly received the response message 190 and has taken the step of removing the request message 140 from the request queue 234. The method then ends at step 770.

Figure 8:
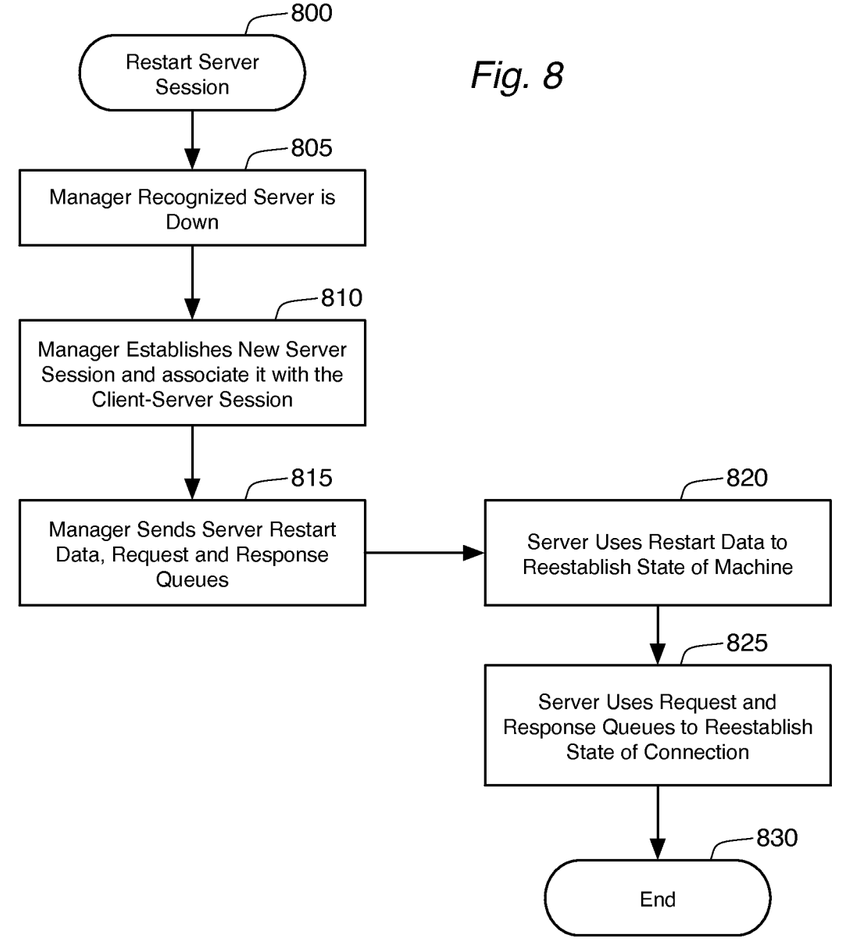
FIG. 8 is a flow chart showing a process for restarting a server session.

FIG. 8 shows a method 800 for restarting a server session (and all of its child client sessions) after the server session has been interrupted. The method 800 starts with the manager computer 200 recognizing that the server session 260 is no longer operating. This recognition can occur through a variety of mechanisms know in the prior art. For example, as explained above the various computers can communicate via various messages that do not constitute requests 140 or responses 190. The messages may include ACK messages that acknowledge the receipt of various communications. If the manager computer fails to receive any ACK messages from a server session 220, 260, the manager computer 200 may consider that process to be interrupted. Alternatively, the manager computer 200 may rely upon other communications protocols (such as TCP/IP) to identify situations where a connection to a process 220, 260 has been lost.

Once the manager computer 200 is identified that a process (such as server process 260) is no longer available, the manager computer 200 will establish or otherwise identify a replacement process and associate that replacement process with the existing client-server session 240 (step 810). In some embodiments, the replacement session (such as a replacement for server session 260) can be created on a completely different physical computer than the server computer 160 that used to run the interrupted server session 260. The manager computer will then send to the replacement session the current request and response queues for the client-server session 240 as well as the restart data necessary for that session (step 815). The new session will then use the restart data to reestablish the machine state of the process as it existed the last time that the restart data was transmitted to the manager computer 200 (step 820). In this way, the process is restarted in a manner similar to that which occurs using prior art checkpoint systems. In addition, however, the new process is also able to use the request and response queues to reestablish the state of connection that is being managed by the client-server session 240 on the manager computer (step 825). No new communication path needs to be established, and both the continuing session (such as client session 230) and the new session (such as a replacement for server session 260) can continue processing their work without any need to restart the communication connection between the two processes. The method then ends at step 830.

Alternatives and Supplemental Uses

The above-described embodiments can cause some security issues if a server is required to respond to all client requests. In the preferred embodiment, the type of services that are provided by server sessions 260 to client sessions 230 are subject to security limits. An administrator can determine and specify these limits, and then store the limits at the manager computer 200. These security limits can prevent some clients from establishing communications with certain servers. For example, a white list can be created for each server, indicating that only clients specified on the white list can request services from that server (the clients can be identified by their parent server processes, or even by the computer that operates the process). It is also possible to allow a connection between a client and a server, but provide service limits as to the types of request that can be made by a specific client during that client-server communication. With the present invention, these limits are stored and maintained at the manager computer 200. Connection restrictions (that prohibit certain client-server connections) can even be enforced by the manager computer 200 by simply not establishing prohibited connections. Service limits can be stored at the manager computer 200 and then provided to the server session 260 when the client-server communication is initiated. The server session 260 will then be responsible for enforcing these limits.

To make the embodiments more useable to existing programs, application programming interfaces can be developed. These APIs provide interfaces that simplify interactions with the invention. For example, a client-side API can be provided that provides an interface that can be called by an external program. The API could translate between calls to the interface and request and response messages shared with a remote server session.

One benefit of the response queues, request queues, and client/server restart data being stored on the manager computer is that a great deal of data is provided about the state of a session. If a session crashes, this data can be used to recreate the state of the session immediately before the crash. A debugger program can use this data to seed a session, and then step through the processes performed by that session in order to improve and speed up offline debugging of crashed sessions.

In another embodiment, a server session that needs to perform work can divide work between multiple clients, and have each client request help from an external server to perform its portion of the work. This same system can allow a server to ask multiple clients to perform the same item of work. Each client will request an external server service to perform the work. The work returned from these server sessions can then be utilized in a variety of ways. For example, the server can send out the work to multiple servers and then simply use the earliest returned result. If different results are possible, the server can compare the results to look for common answers while discarding outlying results.

In one embodiment, the client computer 110 operates as a gateway for external users. Each external user that wishes to utilize the services provided by one or more server computers 160 will access the system through the client computer 110. The client computer 110 will establish a separate server session for each external user. In another embodiment, the client computer 110 operates as a gateway for legacy computing systems. Each legacy computer system receives its own server session 220, and can thereby establish numerous client-server sessions 240 with the server computers 160 in the system.

In FIGS. 1 and 2, the manager computer 200 is shown as a separate computer 200 operating as a node on the network 150. In an alternative embodiment, the functions of the manager computer are placed on networking hardware that forms part of the network 150. Because the server sessions 220, 260 communicate directly with the client-server session 240, their network connections need to be with this networking hardware and not simply pass through the networking hardware. The networking hardware can have its own networking address in order to receive these communications. Alternatively, the networking hardware can act as a network hub and naturally receive all communications passing over the network.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A computerized method for sharing work between a client session and a server session comprising:
   a) on a client computer operating the client session:
      i) generating a request message requesting work to be done,
      ii) identifying client restart data necessary to restart the client session,
      iii) communicating the request message and the client restart data to a manager computer;

b) on the manager computer:
  i) storing the client restart data and the request message in association with a client-server session maintained by the manager computer,
  ii) identifying the server session associated with the client-server session,
  iii) transmitting the request message to the server session,
c) on a server computer operating the server session,
  i) receiving the request message,
  ii) performing the work and generating a response message identifying the results of the work,
  iii) identifying server restart data necessary to restart the server session, iv) communicating the response message and the server restart data to the manager computer;
d) on the manager computer:
  i) storing the server restart data and the response message in association with the client-server session,
  ii) transmitting the response message to the client session,
  wherein the manager computer periodically backs up all data stored in association with the client-server session to a backup manager computer;
e) on the backup manager computer:
  i) identifying an interruption to the manager computer,
  ii) establishing communications with the client computer and causing the client session to restart on the client computer,
  iii) providing the client session with client restart data, the request queue, and the response queue to facilitate restarting of the client session,
  iv) establishing communications with the server computer and causing the server session to restart on the server computer, and
  v) providing the server session with server restart data, the request queue, and the response queue to facilitate restarting of the server session;
wherein the request message is stored in a request queue of messages comprising a plurality of request messages, and further wherein the request queue of messages is transmitted from the client session to the manager computer, stored on the manager computer, and transmitted from the manager computer to the server session, and
wherein the response message is stored in a response queue of messages comprising a plurality of response messages, and further wherein the response queue of messages is transmitted from the server session to the manager computer, stored on the manager computer, and transmitted from the manager computer to the client session.

2. The computerized method of claim 1, wherein the request message contains a request identifier to identify the request message in the request queue of messages.

3. The computerized method of claim 2, wherein the response message contains the same request identifier.

4. The computerized method of claim 2, wherein the client restart data includes a new request identifier.

5. The computerized method of claim 1, wherein the request message and the response message both contain a session identifier so as to identify the client-server session to the manager computer.

6. The computerized method of claim 5, wherein the client restart data and the server restart data both include the session identifier.

7. The computerized method of claim 1, further comprising:
  f) on the manager computer:
    i) identifying an interruption to the server session;
    ii) identifying a replacement server session to replace the interrupted server session;
    iii) transmitting the server restart data, the request message, and the response message to the replacement server session;
    iv) replacing the interrupted server session with the replacement server session in the client-server session;
    v) communicating new request messages from the client session to the replacement server session.

8. The computerized method of claim 1, wherein data stored by the management computer in association with the client-server session are maintained in RAM throughout the duration of the client-server session.

9. The computerized method of claim 1, wherein the client computer, the manager computer, and the server computer are physically separate computing devices.

10. The computerized method of claim 1, wherein the client session and the server session operate on the same physical computing device.

* * * * *